United States Patent
Carlson et al.

[15] 3,657,061
[45] Apr. 18, 1972

[54] REINFORCED CARBON AND GRAPHITE BODIES

[72] Inventors: Walter H. Carlson, Grand Island; Leo C. Ehrenreich, Buffalo, both of N.Y.

[73] Assignee: The Carborundum Company, Niagara Falls, N.Y.

[22] Filed: Dec. 13, 1966

[21] Appl. No.: 601,306

[52] U.S. Cl.................................161/81, 117/46, 156/148, 161/88, 161/98, 161/154, 264/29
[51] Int. Cl....................................D03d 15/00, D03d 11/00
[58] Field of Search.......................161/81, 154, 88, 170, 182; 252/502; 264/29, 105; 117/46; 28/72.2

[56] References Cited

UNITED STATES PATENTS 3,462,289   8/1969   Rohl et al..............................264/29 X

*Primary Examiner*—Robert F. Burnett
*Assistant Examiner*—Roger L. May
*Attorney*—K. W. Brownell

[57] ABSTRACT

A high strength carbon or graphite body formed from a carbon or graphite fiber composite shape having fibers running in three dimensions and a carbon or graphite matrix. The fiber composite is formed by needling layers of carbon or graphite fibers to position some of the fibers of each layer into a running direction substantially perpendicular to the running direction of the layers.

6 Claims, No Drawings

3,657,061

REINFORCED CARBON AND GRAPHITE BODIES

DESCRIPTION OF THE INVENTION

This invention relates to reinforced carbon and graphite articles and more particularly to such articles having reinforcing fibers in an interlaminar direction.

Reinforced carbon and graphite articles are being used in numerous industrial and military applications because of their excellent mechanical properties and high temperature resistance. For example reinforced carbon or graphite has been fabricated into nose cones, molds, heating elements, tubes, rods and the like. A method for making reinforced carbon and graphite articles and the properties of articles made by such method is set forth in application Ser. No. 478,033 entitled REINFORCED CARBON AND GRAPHITE BODIES, now U.S. Pat. No. 3,462,289.

As described more fully in the above-mentioned application, the reinforced carbon or graphite is produced by first forming carbon or graphite fibers into a shape, such as by stacking sheets of carbon or graphite cloth or by wrapping layers of carbon or graphite yarn or tape around a mandrel, then impregnating said shape with a suitable binder. The impregnated shape is then compressed and fired to carbonize the binder. The impregnating may be repeated as often as necessary to achieve the desired product density.

It can be seen that articles made in the above manner comprise laminations of carbon or graphite fibers bound by a carbon or graphite matrix. Such articles, although possessing excellent overall physical properties, are predisposed to failure due to delamination when subjected to high interlaminar stress. This is due to the fact that reinforcing fibers run only in the $x$ and $y$ direction but no fibers run between the layers of reinforcing fibers to provide reinforcing in the $z$ direction.

Accordingly it is an object of this invention to provide carbon or graphite articles that are reinforced not only in the $x$ and $y$ direction but also in the $z$ direction.

It is a further object of this invention to provide a carbon or graphite material which has a longer useful life and greater utility.

Another object of this invention is to provide a method for producing reinforced carbon or graphite having improved interlaminar strength.

Further objects and advantages of this invention will be apparent from a consideration of the following description of the embodiments described below and the novel features thereof will be particularly pointed out hereinafter in connection with the appended claims.

When used in this specification the word carbon includes all suitable forms thereof, including graphite.

The objects and advantages of this invention are achieved by forming a shape consisting of overlying layers of carbon fibers wherein a portion of the fibers of said layers have been disposed in at least an adjacent layer so as to provide interlaminar reinforcement between the layers. The fiber shape is impregnated with a suitable binder and compressed to remove excess binder. The impregnated shape is fired to carbonize the binder.

The carbon fibers used in this invention are derived from the carbonization of carbonizable material such as cellulosic fibers. Graphite fibers may be obtained by graphitizing the carbon fibers by known means. The fibers may be used as woven cloth sheets, strip, yarn or as individual fibers.

The fiber shape comprises a plurality of overlying layers of carbon or graphite fibers. The shape is formed by such means as wrapping fiber or fabric around a mandrel or by stacking sheets of reinforcing fibers until a shape of desired thickness is obtained.

Interlaminar reinforcing is achieved by disposing a portion of the fibers of each overlying layer out of their horizontal plane into at least the adjacent underlying layer. This is accomplished by a process known as needling. Needling comprises subjecting several layers of fibrous material to penetration by one or more barbed needles. The individual needles are provided with projections (barbs) located in various positions on the needle which incline outwardly toward the point of the needle. As the needle enters the fibrous material the barbs engage some of the fibers and carry them along the path of needle travel. Depending on the needle penetration and the number of layers of material to be penetrated, the barbs may engage fibers in several layers through which they pass. When the needle is withdrawn the barbs are disengaged from the fibers and the needle passes back out of the fibrous material. The fibers that had been engaged and carried by the needle barbs remain disposed in the layer to which they were carried by the needle barbs. In this manner needling arranged fibers of the layers in the interlaminar or $z$ direction and the interlaminar fibers lock the layers of material together and provide interlaminar reinforcement.

Depending on the type of equipment used to needle the layers and the thickness of the fiber shape, all the layers can be needled together simultaneously or in a series of needling steps. That is, if the fiber shape is to be of such a thickness that the needles will not penetrate to the innermost layer of the shape, several layers of fibers can be first needled, then additional layers of fibers needled thereto until the shape is built up to its desired thickness.

It will be evident that in order to have fibers disposed in the $z$ direction, the fibers engaged by the needles must either be sheared at some point or pulled out of the weave. In some cases it may be desirable to avoid disruption of the fibers which occurs in the normal needling process. This is accomplished by providing over the surface of a fiber shape, a layer of randomly oriented, chopped fibers. The needling operation is carried out as described, however the needle barbs become loaded with the chopped fibers and carry them into the fiber shape. The chopped fibers are deposited within the fiber shape to provide interlaminar reinforcement. The needle barbs, being loaded with chopped fibers cannot engage the fibers of the shape and thus disruption of the fiber system is avoided.

Although the needled fiber shape is normally formed from carbon fibers, it is within the scope of this invention to form a fiber shape as described above using the precursor fibers and then to carbonize the shape to form carbon fibers.

The following example illustrates more clearly the manner in which a reinforced carbon article having interlaminar reinforcement was produced according to this invention. The invention, however, is not to be construed as being limited to the particular embodiment set forth in the example.

EXAMPLE

A reinforced carbon ring having a thickness of one-half inch, an outside diameter of 8-½ and an inside diameter of 2-½ inches was produced in the following manner.

A fiber pad comprising 55 sheets of carbon cloth having a thread count of 24 × 24 2 ply 1,440 filament yarn was stacked and needled in the following manner. A stack of 4 sheets of carbon cloth was positioned under a needling plate containing a multiplicity of downwardly extending barbed needles. Means were provided for raising and lowering the needling plate a predetermined distance. The needling plate was moved downward causing the barbed needles to penetrate the carbon cloth to stack whereupon the needle barbs engaged portions of the carbon fibers and carried them out of their horizontal plane. After penetration of the stack the needling plate was raised and the barbed needles withdrawn from the fiber stack. This process was repeated until the entire surface of the fiber stack had been subjected to the needling operation. Four more sheets were stacked on the needled fiber stack and needling was repeated as described above. The needling steps were repeated until the 55 sheets of carbon cloth had been needled together to form a pad wherein the reinforcing fibers ran not only in the $x$ and $y$ direction but also in the $z$ direction.

After needling, the fiber pad was placed in an autoclave and evacuated to a pressure of at least 29 inches of mercury. The pad was then pressure impregnated with liquid furfuryl alcohol polymer catalyzed with 5 percent maleic anhydride at a pressure of 120 pounds per square inch for 1-½ hours. The resin impregnated pad was compressed to a thickness of about one-half inches and excess resin removed. The compressed, impregnated pad was cured under a pressure of 90 to 120 p.s.i. for 8 hours at 125° C.

After curing the pad was placed in a protective atmosphere of nitrogen and the temperature was gradually raised to 800° C to carbonize the impregnant resin. The impregnating and carbonizing steps may be repeated until the desired article density is achieved.

After carbonizing the ring was machined to final dimensions.

Articles made according to this invention represent a substantial improvement over conventional reinforced carbon and graphite articles in that not only do such articles have the excellent physical characteristics normally associated with reinforced carbon or graphite articles but they also have improved interlaminar strength due to interlaminar reinforcement. Thus the advantages of fiber reinforcement can be obtained not only in the $x$ and $y$ direction but also in the $z$ direction. Articles can be produced according to this invention having a wide variety of configurations and the method disclosed herein is applicable to fiber wound and tape wound shapes as well as flat lay-up shapes.

It should be clear that the angle at which the needles penetrate the fiber layers may be varied. Thus, in some applications it may be desired to dispose the interlaminar fibers at some angle other than perpendicularly to the plane of the layer. For most applications, however, the running direction of the interlaminar will be substantially perpendicular to the layers.

While the invention has been described in connection with specific embodiments thereof, it will be understood that it is capable of further modification, and this specification is intended to cover any variations, uses or adaptations of the invention. It will, therefore, be recognized that the invention is not to be limited to the precise embodiments shown and described but is to be interpreted as broadly as permitted by the appended claims.

We claim

1. A laminated reinforced article comprising a plurality of overlying layers of intralaminar reinforcing woven fabric formed from fibers selected from the group consisting of carbon and graphite fibers, and a binder selected from the group consisting of carbon and graphite, portions of said fibers of each of said overlying layers being disposed in at least the adjacent underlying layer thereby to provide interlaminar reinforcement.

2. A laminated reinforced article comprising:
   a plurality of overlying layers of intralaminar reinforcing woven fabric formed from fibers selected from the group consisting of carbon and graphite fibers:
   b. a plurality of interlaminar reinforcing fibers selected from the group consisting of carbon and graphite fibers, having a running direction at an angle to the running direction of the overlying layers of intralaminar reinforcing fabric and disposed in adjacent layers of intralaminar reinforcing fabric whereby to provide interlaminar reinforcement; and
   c. a binder selected from the group consisting of carbon and graphite.

3. The laminated reinforced article of claim 2 wherein the interlaminar reinforcing fibers having a running direction at an angle to the running direction of the overlying layers of intralaminar reinforcing fabric are substantially perpendicular to the running direction of the overlying layers of intralaminar reinforcing fabric.

4. The laminated reinforced article of claim 3 wherein the interlaminar reinforcing fibers substantially perpendicular to the running direction of the overlying layers of intralaminar reinforcing fabric comprise a portion of the fibers of the overlying layers of intralaminar reinforcing fabric, the substantially perpendicular fibers being disposed in at least the adjacent underlying layer of intralaminar reinforcing fabric to provide interlaminar reinforcement.

5. The laminated reinforced article of claim 3 wherein the interlaminar reinforcing fibers substantially perpendicular to the running direction of the overlying layers of intralaminar reinforcing fabric comprise chopped fibers which are other than fibers of the overlying layers of intralaminar reinforcing fabric, the substantially perpendicular chopped fibers being deposited within said article and disposed within adjacent layers of intralaminar reinforcing fabric to provide interlaminar reinforcement.

6. A laminated reinforced article comprising a plurality of overlying layers of intralaminar reinforcing woven fabric formed from fibers selected from the group consisting of carbon and graphite fibers and a binder selected from the group consisting of carbon and graphite, wherein the improvement comprises a plurality of interlaminar reinforcing fibers selected from the group consisting of carbon and graphite fibers having a running direction substantially perpendicular to the running direction of the overlying layers of intralaminar reinforcing fabric, the substantially perpendicular interlaminar reinforcing fibers comprising either (a) a portion of the fibers of the overlying layers of intralaminar reinforcing fabric which portion of fibers is disposed in at least the adjacent underlying layer of intralaminar reinforcing fabric to provide interlaminar reinforcement, or (b) chopped fibers other than fibers of the overlying layers of intralaminar reinforcing fabric which chopped fibers are deposited within said article and disposed within adjacent layers of intralaminar reinforcing fabric to provide interlaminar reinforcement.

* * * * *